UNITED STATES PATENT OFFICE.

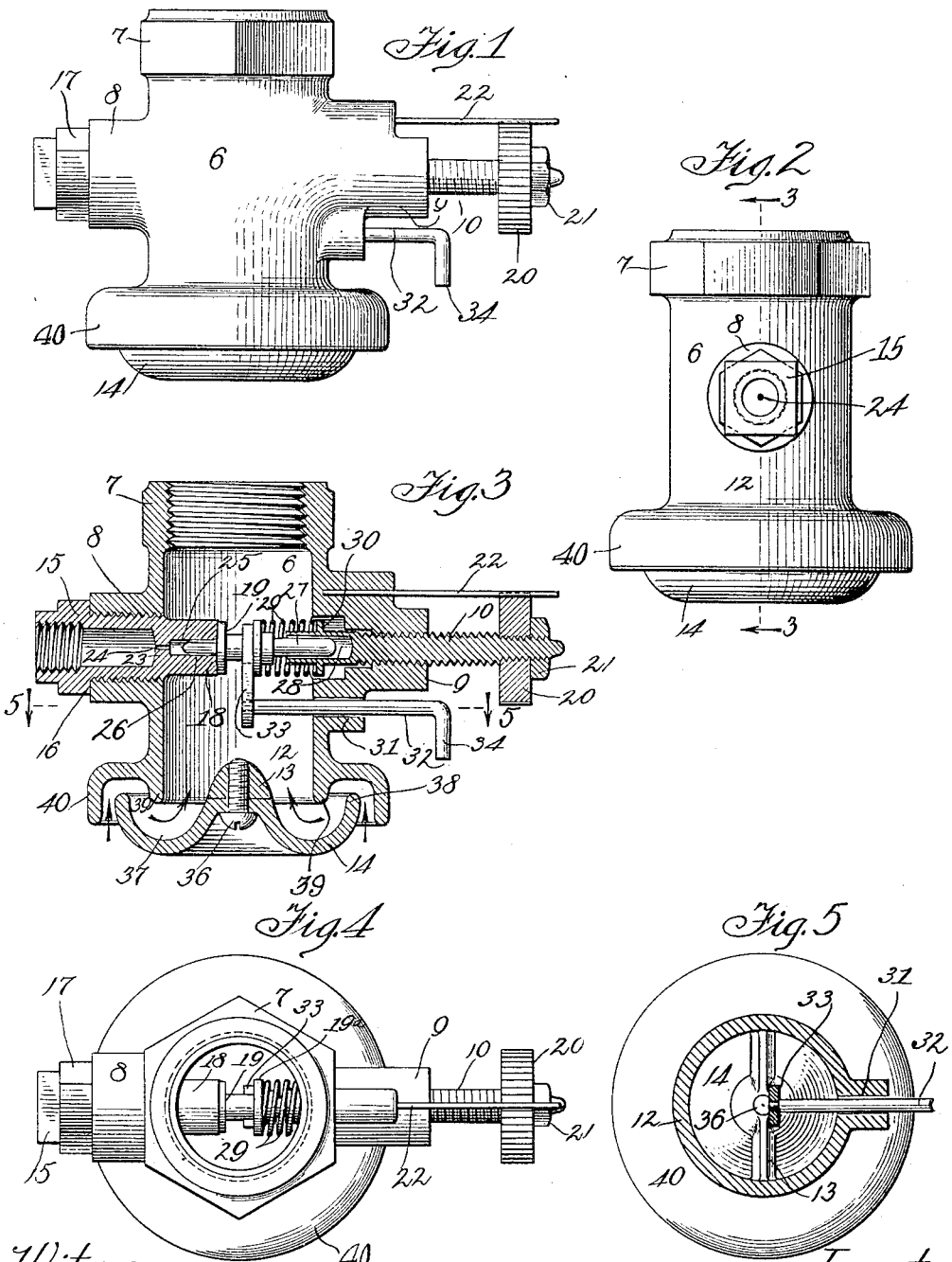

THOMAS ARTHUR MARTIN, OF SPARTA, MICHIGAN, ASSIGNOR, BY MESNE ASSIGNMENTS, TO HERCULES GAS ENGINE COMPANY, OF EVANSVILLE, INDIANA, A CORPORATION OF INDIANA.

CARBURETER.

1,120,397.        Specification of Letters Patent.        Patented Dec. 8, 1914.

Application filed October 12, 1911. Serial No. 654,255.

*To all whom it may concern:*

Be it known that I, THOMAS ARTHUR MARTIN, a citizen of the United States, residing at Sparta, in the county of Kent and State of Michigan, have invented certain new and useful Improvements in Carbureters, of which the following is a specification.

This invention relates to a mixing valve for internal combustion engines.

The objects of the invention are to provide a mixing valve that will be adjustable for thoroughly mixing the air and gasolene in the best proportions, that will avoid waste of fuel, that will be simple and cheap to construct, and that will be convenient and durable in use. These and further objects will be understood from the detailed description hereinafter set forth.

In the accompanying drawings Figure 1 is a front elevation of a valve embodying the features of my invention; Fig. 2 is a left side elevation; Fig. 3 is a vertical axial section of the said valve along line 3 3 of Fig. 2; Fig. 4 is a top plan view of the valve; and Fig. 5 is a horizontal transverse section of the valve along the line 5 5 of Fig. 3.

In these drawings like parts are indicated by like reference numerals.

The mixing valve as a whole comprises an integral body or casing 6, upon and in which the various other parts are arranged. The interiorly threaded nipples 7, 8 and 9 on said casing are for gaseous mixture outlet, fuel inlet, and feed adjusting stud 10, respectively. An air inlet portion 12 extends downward oppositely from the said outlet nipple 7 and is provided with a transverse central bridge 13 having an upwardly turned drip cup 14 mounted thereon. The outlet nipple 7 may be connected either by means of an intermediate pipe or directly with the engine as will be understood.

The inlet nipple 8 has an exteriorly threaded tubular feed stem 15 screwed therein. Near the outer end on this stem is a flange or shoulder 16 abutting against the casing and having sides 17 adapted to be engaged by a wrench. The outer end is also threaded for connection to the source of fuel. The inner end 18 of the stem extends well in toward the center of the cavity in the casing where it coacts with a valve 19 as will be described.

Directly opposite from the feed stem is the member 9 in which there is threaded the long narrow adjusting stud 10 coaxial with the said feed stem 15. This stud 10 has a knurled finger wheel 20 fixed on its outer end to facilitate turning. The wheel 20 may be secured by the lock nut 21. A spring rod 22 is fixed at one end to the casing 6 and at its other end bears against and engages said knurled wheel 20 and prevents accidental turning thereof. The opposite or inner end of stud 10 is tubular and extends well into the casing cavity where it coacts with the valve mechanism.

On the inside of the feed stem 15 near its inner end 18 is an internal annular flange 23 with a restricted passage or jet hole 24 therethrough leading from the large tubular cavity at the outer end to the relatively narrow cavity 25 at the inner end. This narrow cavity constitutes a port for the feed valve 19, and the inner end of the stem, which is finished true and smooth, serves as a valve seat.

The valve 19 comprises a flat disk having oppositely extending stem or guide members, one as 26 extending loosely into the tubular port 25 of the feed stem, and the other as 27 extending into the hollow end 28 of stud 10. A helical spring 29 surrounds the stem 27 and reacts between a flange 19$^a$ on said stem and a flange 30 on the stud 10 to hold the valve 19 normally closed against the seat 18. As long as the feed stem 15 is in its normal position with its shoulder 16 abutting against the casing the valve 19 cannot get out of operative position as the opposite outward movement of stud 10 is limited by flange 30.

Freely slidable in an opening 31 in the casing 6 is a rod 32 which carries at its inner end a head 33, said head being bifurcated to embrace the valve member 19. At the outer end of the rod 32 is an angular extension 34 adapted to be gripped by the fingers to slide the rod 32.

The bridge 13 may be integral with the casing but the drip cup 14 is best attached by a screw 36 extending upward through the axial portion of the cup which is bulged upward. The outer part of the cup is formed as an annular trough 37 with upwardly turned edges 38 coaxial with the central mounting screw. The cylindrical lower edge 39 of the valve casing extends downwardly slightly within the cup.

An outwardly extending flange 40 integral with the casing curves downwardly around the outer edge of the cup with a restricted air passage between as shown in Fig. 3.

The casing 6 is preferably made as an integral casting, and the only machine work ordinarily required is the drilling and threading of the openings, as shown on the drawings, and the finishing of the lower end 39 of the casing so that the air inlet space shall be of definite and uniform size. The drip cup may, if desired, be punched from sheet metal and stamped into shape.

In starting the engine, the valve 19 may be opened by the attendant through the medium of the rod 32 long enough to permit a small quantity of gasolene to escape and drip down into the trough 37 of the drip cup for priming purposes where it will be rapidly evaporated and mixed with the incoming air as the engine is given a few preliminary rotations. As soon as the engine starts, gasolene will be fed regularly by the valve 19 which will be opened periodically by the suction from the engine cylinder, the air passage between the cup 14 and casing 6 being so small and restricted that a partial vacuum is formed in the main cavity as the engine piston recedes in the course of its cycle. The proportion of gasolene to air is adjustable by turning wheel 20 and so regulating the pressure of the valve spring 29.

The device may be taken apart by unscrewing the feed stem 15, removing the lock nut 21 and wheel 20, unscrewing the stud 10 inwardly and removing it through the fuel feed nipple 8.

As changes in structure will occur to those skilled in the art without departing from the spirit of my invention I do not wish to be limited to the exact details herein set forth.

I claim as my invention:

1. In a carbureter, the combination of a casing; a feed stem extending within said casing; a valve within said casing and having a guide stem fitting loosely within said feed stem; a threaded adjusting stud coaxial with said feed stem and extending through the opposite wall of said casing; and a helical spring, one end of which engages the inner portion of said adjusting stud and the other end of which engages the said valve, said casing having a restricted inlet passage for air and an exit passage.

2. A carbureter having an inlet port; an adjustable member opposite said port; a valve closing said port; a spring positioned between said valve and said adjustable member and tending to hold said valve closed; manually operable means for opening said valve; and a restricted air inlet passageway, which is at all times open.

3. A carbureter comprising a casing; a feed stem screw-threaded in one side of said casing and having an inlet port therethrough; an adjusting stud threaded in said casing opposite said feed stem; a valve member slidably carried by the inner ends of said feed stem and adjusting stud and adapted to close said port; a spring tending to hold said valve closed, and manually operable means for opening said valve.

4. A carbureter comprising a casing; a feed stem threaded in one side of said casing and having a fuel inlet port therethrough; an adjusting stud threaded in said casing opposite said feed stem; a valve member slidably carried by the inner ends of said feed stem and said adjusting stud; and a coiled spring located between said valve member and said adjusting stud and tending to hold said valve member closed, said feed stem being withdrawable outwardly from the casing, and said adjusting stud being removable inwardly and through the opening for said feed stem.

5. In a carbureter the combination of a tubular feed stem, an adjustable stud in coaxial alinement with said stem, said stud having a tubular hollow in its inner end coaxial with the said stem and stud, said stud also having an external radial flange intermediate the inner end and the central part of said stud; a valve lying between said stem and stud and engaging the former, said valve having oppositely extending guide stems lying reciprocably within the inner ends of said stem and stud, and a helical spring surrounding the inner end of said stud and reacting between the said valve and flange to close the valve.

6. A carbureter comprising a casing; a feed stem mounted on one side of said casing and having a fuel inlet port therethrough; an adjusting stud threaded in the opposite side of said casing and in alinement with said feed stem; a valve slidably carried by the inner ends of said feed stem and said adjusting stud and adapted to close said inlet port; a coiled spring acting between said adjusting stud and said valve and tending to close the latter; a drip-cup beneath said inlet port; and a rod slidable in said casing and engaging said valve to permit of manually opening said valve.

7. A carbureter having a fuel inlet passageway, the outlet portion of said passageway being materially larger than the inlet portion and forming at its end a valve port, an adjustable member opposite said port, a valve closing said port, a compression spring positioned between said valve and said adjustable member and tending to hold the former closed, said carbureter having an air inlet passageway which is at all times open, said passageway having a restriction therein external to the position of said valve port.

8. A carbureter having a fuel inlet passageway, one portion of said passageway forming at its end a valve port and being materially larger than the other portion of said passageway, an adjustable member opposite said port, a valve closing said port, a spring positioned between said valve and said adjustable member and tending to hold said valve closed, manually operable means for opening said valve, and a restricted air inlet passageway which is at all times open.

In testimony whereof I affix my signature in presence of two witnesses.

THOMAS ARTHUR MARTIN.

Witnesses:
BRUCE N. KEISTER,
O. E. WALCOTT

Copies of this patent may be obtained for five cents each, by addressing the "Commissioner of Patents, Washington, D. C."